3,004,060
1-CYANOFORMIMIDIC ACID HYDRAZIDE

Lucille T. Morin and Ken Matsuda, Stamford, Conn., assignors to American Cyanamid Company, New York, N.Y., a corporation of Maine
No Drawing. Filed Mar. 2, 1959, Ser. No. 796,202
6 Claims. (Cl. 260—465.5)

The present invention deals with 1-cyanoformimidic acid hydrazide and the preparation thereof. More specifically, it is concerned with reaction product of cyanogen and an equimolar amount of hydrazine, the product having the formula

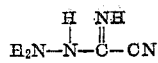

In the past, reaction of cyanogen and hydrazine has been variously reported in the literature. Even as early as 1893 (Gazz. chim. ital. 23, 101–4) and 1894 (J. prakt. Chem. 50, 241–74) the subject is discussed. The subject was novel enough to form the basis of a thesis in 1936 (Avh. norsk Vidensk-Acad., Oslo, Mat. nat. Klasse 1936, No. 5). However, in these references and similar references the reaction product is always found to be oxalimidic acid dihydrazide

from hydrazine and cyanogen in the ratio (molar) of 2:1. Equimolar ratio reaction products were not known.

According to the present invention a method of making the novel equimolar ratio reaction product, i.e., 1-cyanoformimidic acid hydrazide, has been found. Generally speaking, equimolar amounts of cyanogen and the hydrazine reactant are reacted at a relatively low temperature in a solvent medium.

As thus broadly stated, the reaction appears simple. However, the exact converse is true, and definite precautions must be exercised to obtain optimum results. These include control of temperature, reaction proportions, and choice of the proper solvent media.

To insure against further reaction of the desired product with hydrazine to form the 2:1 mol ratio product mentioned above, i.e., oxalimidic acid dihydrazide, the temperature should be as low as is consistent with a reasonable reaction rate. It should be below about 50° C., and preferably below 20° C., usually about 2° C.–15° C. being good practice. Good agitation to insure efficient dissemination of hydrazine and uniform temperature distribution is essential.

It will be noted that the upper temperature limit, in any given run, is very often restricted, as will be seen hereinafter, by the boiling point of the solvent or solvent pair employed.

The process of the present invention may be continuous, semi-continuous, or batch, and it may be carried out at atmospheric, sub-atmospheric or super-atmospheric pressures.

While almost an unlimited excess of cyanogen to hydrazine may be employed, according to the instant discovery, only a maximum molar ratio of hydrazine to cyanogen of about 1.8 to 1.0 can be tolerated without running the risk of producing the undesirable dihydrazide. Preferably, the reactants are brought together in equimolar proportions under the conditions contemplated herein. However, a cyanogen to hydrazine molar excess of up to 50:1, or more, is contemplated.

Although the final product is derived from a reaction of substantially equimolar feed proportions of the reactants, the cyanogen reactant should be present in excess until reaction is substantially complete. For this reason, the simplest procedure is the addition of the hydrazine to the cyanogen in an appropriate solvent. Where this is not practical, the cyanogen may be added stepwise or continuously but at such rates that unreacted cyanogen is present in excess throughout the reaction. The hydrazine reactant is then added to the reaction mixture stepwise or continuously.

Finally, the reaction medium should be correctly chosen. Both cyanogen and the hydrazine reactant should be soluble therein. The reaction product should be as insoluble therein as possible. Where no single solvent has the necessary properties, a combination of solvents, such as a dioxane-methanol mixture, will often fulfill the requirements.

Generally speaking, solvent pairs are employed to effectively solubilize the reactants, the solvents constituting these pairs being chosen and being present in select proportions to provide that the product hydrazide is relatively or substantially insoluble therein. For example, cyanogen is quite soluble in ethers, such as dioxane, diethylether, diisopropylether, di-n-butylether, and the like, whereas the desired product is insoluble therein under the conditions of the reaction. In addition, the components of the solvent pairs are mutually soluble.

Hydrazine, on the other hand, is relatively insoluble in these ethers but readily soluble in water, acetone, alcohols (methanol, ethanol, and the like), and similar polar solvents.

Since the desired product is soluble in these polar solvents, and although this solubility is counteracted to a substantial degree by the presence of the ether, it is a preferred embodiment of the present discovery to maintain the percentage of polar solvent present during reaction and in contact with the product, basis the total weight amount of solvent, below about 10 percent by weight.

According to a very effective embodiment of the instant invention the cyanogen is dissolved in an ether, such as dioxane, and to this mixture is added hydrazine dissolved in a small amount of polar solvent, such as methanol, the hydrazine-polar solvent being, in turn, admixed with an ether. Generally, the ether is the same as that used to dissolve the cyanogen component.

The invention will be more fully described in conjunction with the following examples which are intended to be illustrative but not limiting to the scope of the discovery. Except as otherwise noted, all parts and percentages are by weight and all temperatures in degrees centigrade.

EXAMPLE I

*1-cyanoformimidic acid hydrazide*

To a stirred solution of 156 parts of cyanogen in 1000 parts of dioxane, at 3°–10°, is added, over a period of 2.5 hours, a solution of 96 parts of hydrazine in 330 parts of a dioxane-methanol (10–1) mixture. After about one half hour, crystallization starts and the solution gradually turns orange. After hydrazine addition is completed, agitation is continued for an additional half hour at about 5° C. Product is collected by filtration as 208.3 parts of light orange solid, melting at 73°–77°. It is recrystallized from ethylene dichloride, yielding yellow plates, melting at 83°–86° C. Analysis (percent) for $C_2H_4N_4$ is as follows:

|  | Carbon | Hydrogen | Nitrogen | Mol. Weight |
|---|---|---|---|---|
| Calculated | 28.57 | 4.8 | 66.64 | 84.08 |
| Observed | 29.26; 29.56 | 4.97; 4.94 | 65.73 | 86.5 |

EXAMPLE II

1-cyanoformimidic acid hydrazide

Two hundred and eighteen grams (4.3 moles) of cyanogen is passed into 1200 milliliters of dioxane with stirring. The addition is started at room temperature (21° C.–23° C.) and the temperature is gradually lowered to 15° C. At about 15° C., 128 grams (4.0 moles) of hydrazine in a solution of 350 milliliters of dioxane and 25 milliliters of methanol is added dropwise and with stirring over a period of 3 hours. The product precipitates during this time. The mixture is stirred for an additional 0.5 hour and subsequently filtered. On drying, 263 grams of light orange solid is obtained. Recrystallization from ether gives white product 1-cyanoformimidic acid hydrazide needles having a melting point of 84° C.–86° C.

EXAMPLE III

1-cyanoformimidic acid hydrazide

Fifty-two grams (1.0 mole) of cyanogen is passed into 300 milliliters of diethylether at 0° C.–5° C. A solution of 32 grams (1.0 mole) of hydrazine in a solution comprising 100 milliliters of diethylether and 10 milliliters of methanol is added dropwise with stirring at 0° C.–5° C. The product 1-cyanoformimidic acid hydrazide precipitates during the course of addition, is then filtered and recrystallized.

The product of the present invention in dibutyl phthalate gives a water-in-oil type emulsification and, in the presence of a solvent, speeds the rate of sedimentation of clay. In addition, the novel product prepared as described herein is useful as a herbicide.

While the present invention has been described in detail as to specific embodiments thereof, it is not intended that these details create undue limitations upon the scope of the discovery, except insofar as they appear in the appended claims.

We claim:

1. A compound of the formula

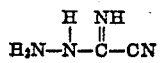

2. A method of preparing a 1-cyanoformimidic acid hydrazide of the formula

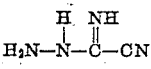

which comprises admixing hydrazine with cyanogen, at a temperature below about 50° C., in the presence of a solvent medium in which resultant 1-cyanoformimidic acid hydrazide is substantially insoluble, said medium comprising an inert polar solvent for hydrazine and an inert ether solvent in which cyanogen is soluble, maintaining said reaction temperature and an excess of cyanogen relative to the hydrazine reactant until reaction is substantially complete, and recovering the resulting precipitated 1-cyanoformimidic acid hydrazide.

3. A process according to claim 2 wherein the polar solvent is present in the concentration of less than about 10 percent by weight of the total weight of the solvent medium.

4. A process according to claim 2 wherein the inert organic solvent medium is a mixture of dioxane and methanol.

5. A process according to claim 2 wherein the temperature is maintained below about 20° C.

6. A method of preparing a 1-cyanoformimidic acid hydrazide of the formula

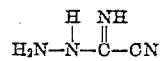

which comprises establishing a solution of cyanogen in an inert ether solvent in which cyanogen is soluble and adding thereto with agitation and at a temperature below about 50° C. a solution of hydrazine in an inert polar solvent and an inert ether solvent, maintaining said reaction temperature and an excess of cyanogen relative to the hydrazine reactant until reaction is substantially complete and product precipitation ceases, and recovering the resulting 1-cyanoformimidic acid hydrazide.

References Cited in the file of this patent

Angeli: Gass. Chim. Ital., 23 (1893), pages 101–104.
Curtius et al.: J. Prakt. Chem., 50 (1894), pages 245, 253 and 254.